United States Patent
Russell et al.

(10) Patent No.: US 12,299,934 B2
(45) Date of Patent: May 13, 2025

(54) SYSTEMS, METHODS, AND APPARATUS FOR PIGGYBACK CAMERA CALIBRATION

(71) Applicant: GoPro, Inc., San Mateo, CA (US)

(72) Inventors: Andrew Russell, San Francisco, CA (US); Robert McIntosh, Marina Del Rey, CA (US)

(73) Assignee: GoPro, Inc., San Mateo, CA (US)

( * ) Notice: Subject to any disclaimer, the term of this patent is extended or adjusted under 35 U.S.C. 154(b) by 348 days.

(21) Appl. No.: 17/815,507

(22) Filed: Jul. 27, 2022

(65) Prior Publication Data

US 2024/0037793 A1    Feb. 1, 2024

(51) Int. Cl.
    *G06T 7/30*      (2017.01)
    *G06T 7/80*      (2017.01)
    *H04N 23/68*      (2023.01)

(52) U.S. Cl.
    CPC ............ *G06T 7/85* (2017.01); *H04N 23/685* (2023.01); *G06T 2207/20081* (2013.01)

(58) Field of Classification Search
    CPC ... G06T 7/85; G06T 2207/20081; G06T 7/80; H04N 23/685; H04N 17/002
See application file for complete search history.

(56) References Cited

U.S. PATENT DOCUMENTS

| | | | |
|---|---|---|---|
| 9,681,111 B1 | 6/2017 | Newman | |
| 10,911,677 B1 * | 2/2021 | Zhou | ...................... H04N 23/90 |
| 2007/0258707 A1 | 11/2007 | Raskar | |
| 2008/0253685 A1 | 10/2008 | Kuranov | |
| 2011/0304694 A1 * | 12/2011 | Nestares | ............ H04N 23/6812 348/46 |
| 2015/0341536 A1 | 11/2015 | Huang | |
| 2018/0130497 A1 * | 5/2018 | McCauley | ........... H04N 21/233 |
| 2021/0118182 A1 * | 4/2021 | Avnat | ......................... G06T 5/50 |
| 2022/0030177 A1 | 1/2022 | Newman | |
| 2023/0109047 A1 | 4/2023 | Stimm | |
| 2023/0144635 A1 | 5/2023 | Newman | |
| 2023/0245688 A1 | 8/2023 | Newman | |
| 2023/0247292 A1 | 8/2023 | Stimm | |
| 2023/0368414 A1 * | 11/2023 | Afrooze | ................... G06N 3/08 |

FOREIGN PATENT DOCUMENTS

| | | | | | |
|---|---|---|---|---|---|
| CN | 113324528 A | * | 8/2021 | ............. | G01C 11/08 |
| CN | 114399554 B | * | 5/2024 | ............... | G06T 7/85 |

* cited by examiner

*Primary Examiner* — Shervin K Nakhjavan
(74) *Attorney, Agent, or Firm* — Wang Hardoon, P.C.

(57) ABSTRACT

Systems, apparatus, and methods for piggyback camera calibration. Existing piggybacked capture techniques use a "beauty camera" and an "action camera" to capture raw footage. The user directly applies the EIS stabilization track of a piggybacked action camera to the cinematic footage to create desired stable footage. Unfortunately, since the action camera may have been slightly offset from the cinematic video camera, the EIS stabilization data will only roughly approximate the necessary corrections. In other words, the user must manually fine tune the corrections. The disclosed embodiments use a calibration sequence to estimate a physical offset between the beauty camera and the action camera. Then, the estimated physical offset can be used to calculate an offset camera orientation for stabilizing the beauty camera. The foregoing process can be performed in-the-field before actual capture. This allows the user to check their set-up and fix any issues before capturing the desired footage.

19 Claims, 8 Drawing Sheets

RECTILINEAR LENS | NON-RECTILINEAR LENS

SYSTEMS, METHODS, AND APPARATUS FOR PIGGYBACK CAMERA CALIBRATION

RELATED APPLICATIONS

This application is generally related to the subject matter of U.S. patent application Ser. No. 17/449,713 entitled "METHODS AND APPARATUS FOR RE-STABILIZING VIDEO IN POST-PROCESSING" filed Oct. 1, 2021, and U.S. patent application Ser. No. 16/934,628 entitled "METHODS AND APPARATUS FOR METADATA-BASED PROCESSING OF MEDIA CONTENT" filed Jul. 21, 2020, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of image processing. More particularly, the present disclosure relates to systems, computer programs, devices, and methods for calibrating multiple-camera configurations.

DESCRIPTION OF RELATED TECHNOLOGY

In traditional cinematography, raw footage is framed and shot under controlled circumstances. During post-processing and editing, shots are selected and assembled into scenes; scenes may be further augmented with production effects (visual and audio effects). The nearly ubiquitous availability of high-quality media has cultivated consumer tastes for high production value content; this often entails specialized equipment (camera dollies, stabilization rigs) and/or sophisticated editing techniques (e.g., sound effects, artistic visualizations, etc.).

Action cameras are a relatively recent phenomenon. Unlike traditional photography, action cameras are typically designed to capture immersive footage (e.g., motion in a 360° world). For a variety of reasons, action cameras are typically compact, ruggedized, and designed to require minimal interaction once recording has begun. In most situations, the action camera user cannot control shooting conditions; interesting moments fleetingly occur and often cannot be replicated. As a result, content generated by action cameras often require significant editing; a lot of raw footage may be uninteresting (e.g., the user may be waiting for action to happen), and shots may need to be re-framed (e.g., were captured off-center, etc.).

Effective cinematography conveys storyline, emotion, excitement, etc. While there are important differences between traditional and action camera footage, ultimately "pro-sumers" often want the ability to blend the best parts of cinema production with immersive content.

DETAILED DESCRIPTION

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Audio/Visual Tracks and Post-Processing

Figure 1:
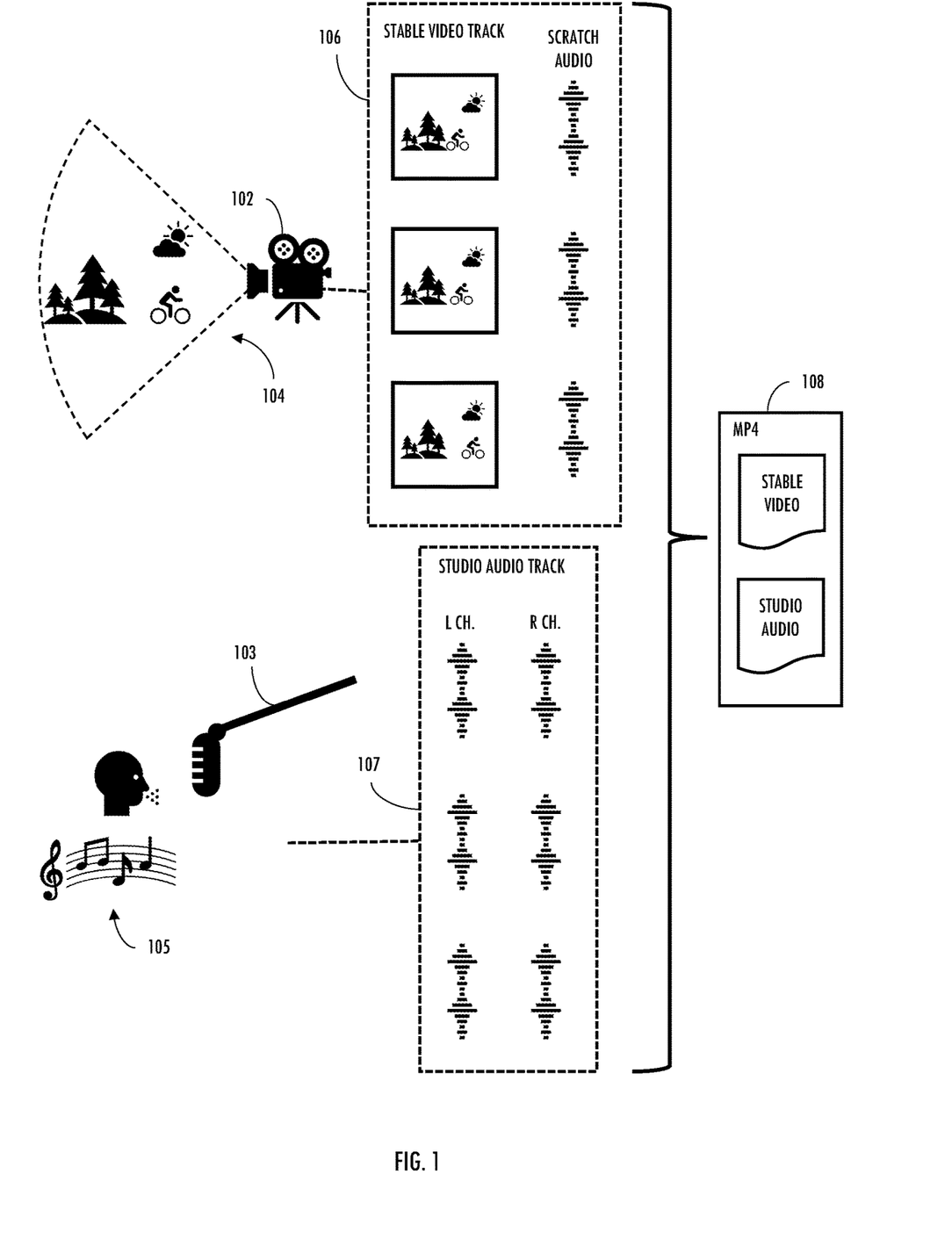
FIG. 1 is a graphical representation of a cinematic video camera capturing footage, useful to illustrate various aspects of the present disclosure.

FIG. 1 is a graphical representation of a cinematic video camera capturing footage, useful to illustrate various aspects of the present disclosure. As shown, the video camera 102 captures a subject 104. Unlike handheld cameras, cinematic cameras are typically mounted on stabilizing apparatus (e.g., fixed tripods, camera dollies, camera trucks, stabilizing gimbals, etc.). Additionally, most directors use separate boom microphones 103 to capture audio 105; in some cases, audio may be captured separately from video (e.g., in a sound studio.)

Isolating the capture of video from audio, maximizes the director's flexibility. For example, in this case the director can capture a stable video track with scratch audio (media file 106). Separately, musical scoring, sound effects, and/or dialogue can be recorded under carefully controlled studio conditions (studio audio track 107). Later the stable video track and studio audio track can be spliced together in "post" (i.e., after capture/recording) to create a resulting media track 108. In some cases, the video and audio tracks from multiple different "takes" can be re-arranged, composited, and/or mixed; this enables a director to select the best scenes to tell the story narrative. The flexibility of post-processing greatly affects the resulting video and audio tracks; high image quality, cohesive narrative, and crisp audio are the hallmark of cinema quality media.

Figure 2:
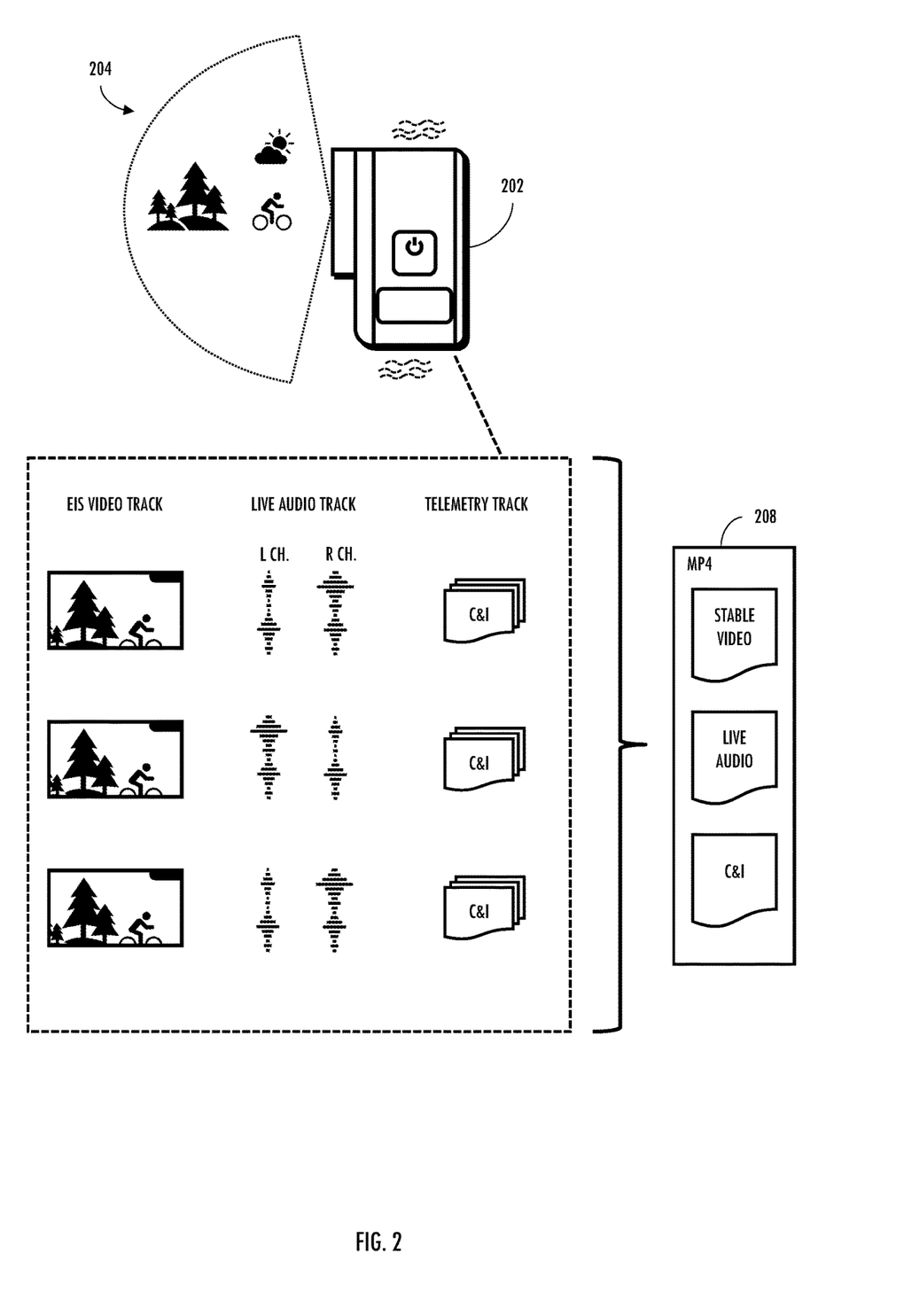
FIG. 2 is a graphical representation of an action camera capturing footage, useful to illustrate various aspects of the present disclosure.

FIG. 2 is a graphical representation of an action camera capturing footage, useful to illustrate various aspects of the present disclosure. As shown, the action camera 202 captures a subject 204. Live audio may be captured by directional microphones that are mounted to the chassis of the action camera. Even though the action camera is handheld and shaky, the action camera stabilizes the resulting video based on sensed telemetry data. Specifically, in-camera Electronic Image Stabilization (EIS) uses sensor data (e.g., gyroscope) to determine the movement of the capture device. Then, each frame of video is rotated (tilted) and/or translated (panned) to counteract the sensed motion. In-camera EIS greatly reduces apparent motion caused by camera shake and frame-to-frame jitter. As used herein, the term "apparent motion" refers to the illusion of an object's motion caused by the relative motion between the capture device and the object. The stable video and live audio are encoded into a media file 208 (e.g., an MPEG-4 audio/visual file).

In some variants, in-camera stabilization metadata may be included in the media file 208 to enable subsequent post-processing. Post-processing may improve, enlarge, and/or modify the stabilized video. Such techniques are described in U.S. patent application Ser. No. 17/449,713 entitled "METHODS AND APPARATUS FOR RE-STABILIZING VIDEO IN POST-PROCESSING" filed Oct. 1, 2021, previously incorporated herein by reference in its entirety. As described therein, previously stabilized video can be reconstructed and re-stabilized to provide for improved stabilization (e.g., a wider crop, etc.) For example, camera-aware post-processing can reuse portions of the in-camera stabilized videos while providing additional benefits (e.g., the ability to regenerate the original captured videos in post-production and re-stabilize the videos). Camera-aware post-processing can also improve orientation metadata and remove sensor error.

Figure 3:
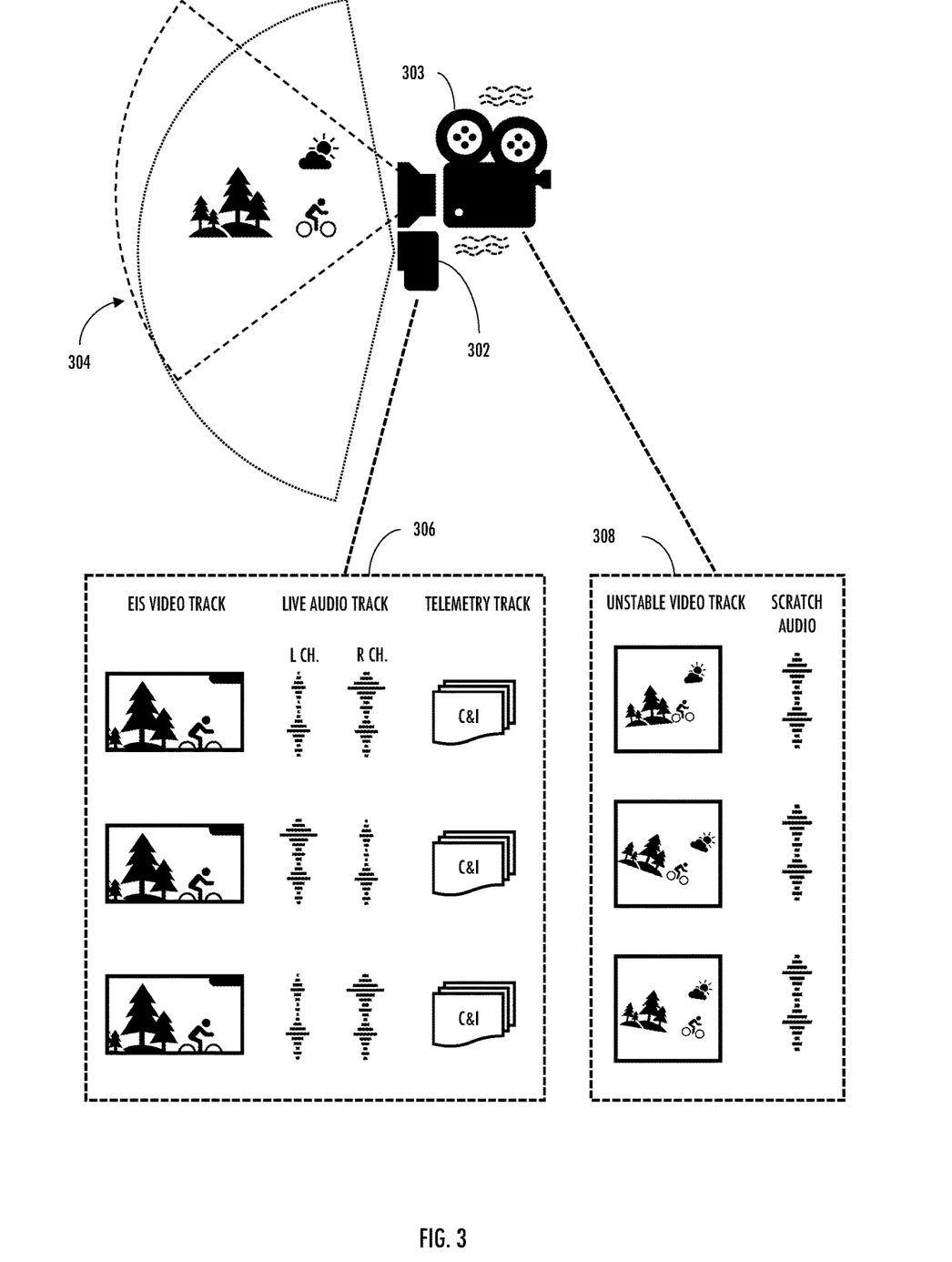
FIG. 3 is a graphical representation of a "piggybacking" 2-camera assembly, useful to illustrate various aspects of the present disclosure.

In some applications, the telemetry data that can be captured with action cameras may be more useful than its audio/visual media capture. For example, as shown in FIG. 3, an action camera 302 is rigidly attached to another camera (e.g., a cinematic video camera 303); this "piggybacking" configuration may be used where the user wants the telemetry track information from the action camera but also desires the "look-and-feel" or other shooting capabilities of a specific camera. Notably, the telemetry track information can be used in post-processing to enable metadata-based cinematography, production effects, shot selection, and/or other content augmentation. Such techniques are described in U.S. patent application Ser. No. 16/934,628 entitled "METHODS AND APPARATUS FOR METADATA-BASED PROCESSING OF MEDIA CONTENT" filed Jul. 21, 2020, previously incorporated herein by reference in its entirety. The various techniques described therein leverage the camera's actual experiential data to enable cinema-quality post-processing for the general consuming public. Instantaneous metadata-based cinematography and shot selection advisories and architectures are also described.

As shown, the action camera 302 and cinematic video camera 303 both capture the same scene 304. In this configuration, the action camera captures a media data structure 306 that includes an EIS video track, live audio, and telemetry data; the cinematic video camera 303 captures a media data structure 308 with an unstable video track and scratch audio. Ideally, the user can post-process the unstable video track using the EIS metadata (e.g., telemetry data) to get their desired video footage and/or to mix in audio effects, time synchronize other aesthetically pleasing effects, etc.

Existing piggybacked capture techniques largely rely on post-processing to stabilize the video feed of the cinematic video camera 303. Specifically, the user directly applies the EIS stabilization track of the action camera 302 to the cinematic video camera 303. The EIS stabilization track includes the counter rotations that counteract the action camera's motion. Unfortunately, since the action camera 302 was slightly offset from the cinematic video camera 303, the EIS stabilization data will only roughly approximate the necessary corrections. In other words, the user must manually fine tune the corrections—anecdotally, this process is extremely labor intensive and/or cumbersome. Furthermore, since correction is done in post-processing, the user often cannot re-shoot footage (i.e., they may be stuck with off-angle shots, etc.) Improved methods for piggyback camera calibration are needed.

Exemplary Techniques for Piggyback Camera Calibration

As a brief aside, humans often conceptualize device orientation in terms of Euler angles e.g., a three-dimensional coordinate frame. Most devices, however, describe rotations using quaternions. Quaternions are a four-dimensional vector generally represented in the form $a+bi+cj+dk$ where: a, b, c, d are real numbers; and i, j, k are the complex numbers that satisfy $i^2=j^2=k^2=ijk=-1$. Points on the unit quaternion can represent (or "map") all orientations or rotations in three-dimensional space. In other words, Euler angles and quaternions may be converted to one another. Quaternion calculations can be more efficiently implemented in software to perform rotation and translation operations on image data (compared to analogous operations with Euler angles); thus, quaternions are often used to perform EIS manipulations (e.g., pan and tilt using matrix operations). Additionally, the higher-order dimensionality of quaternions can prevent/correct certain types of errors/degenerate rotations (e.g., gimble lock.) While discussed with reference to quaternions, artisans of ordinary skill in the related art will readily appreciate that the orientation may be expressed in a variety of systems.

Referring back to the piggybacking configuration of FIG. 3, quaternions could be used to translate the rotation of the action camera 302 to infer the rotation of the cinematic video camera 303. In other words, the physical offset between the cameras could be conjugated by the action camera's orientation (CORI) to mathematically create the combined rotation of the offset cinematic camera (OCORI), according to the following properties:

Action Camera Orientation (CORI): $q_{action}=a_a+b_a i+c_a j+d_a k$

Physical Offset: $P_{offset}=(p_x,p_y,p_z)=p_x i+p_y j+p_z k$

Offset Camera Orientation (OCORI): $P'_{offset}=q_{action}P_{offset}q^{-1}_{action}$ While quaternion rotation/translation computations are well known in the computing arts, the physical offset is unknown and must be "calibrated" with great precision. Real world considerations may introduce additional complexity. For example, users may mount the cameras with any arbitrary separation distance and/or angular offset. In some cases, the cameras may be jerry-rigged or otherwise improvised from available materials that are loose/wobbly (e.g., duct tape, etc.) Furthermore, some users may physically modify their cameras to e.g., reduce weight, adjust form factor, etc. As but one such example, some users remove protective housings and/or batteries to reduce the camera weight for aerial drone applications. Differences in lens characteristics may also make visual inspection/calibration difficult to visually estimate.

Figure 4:
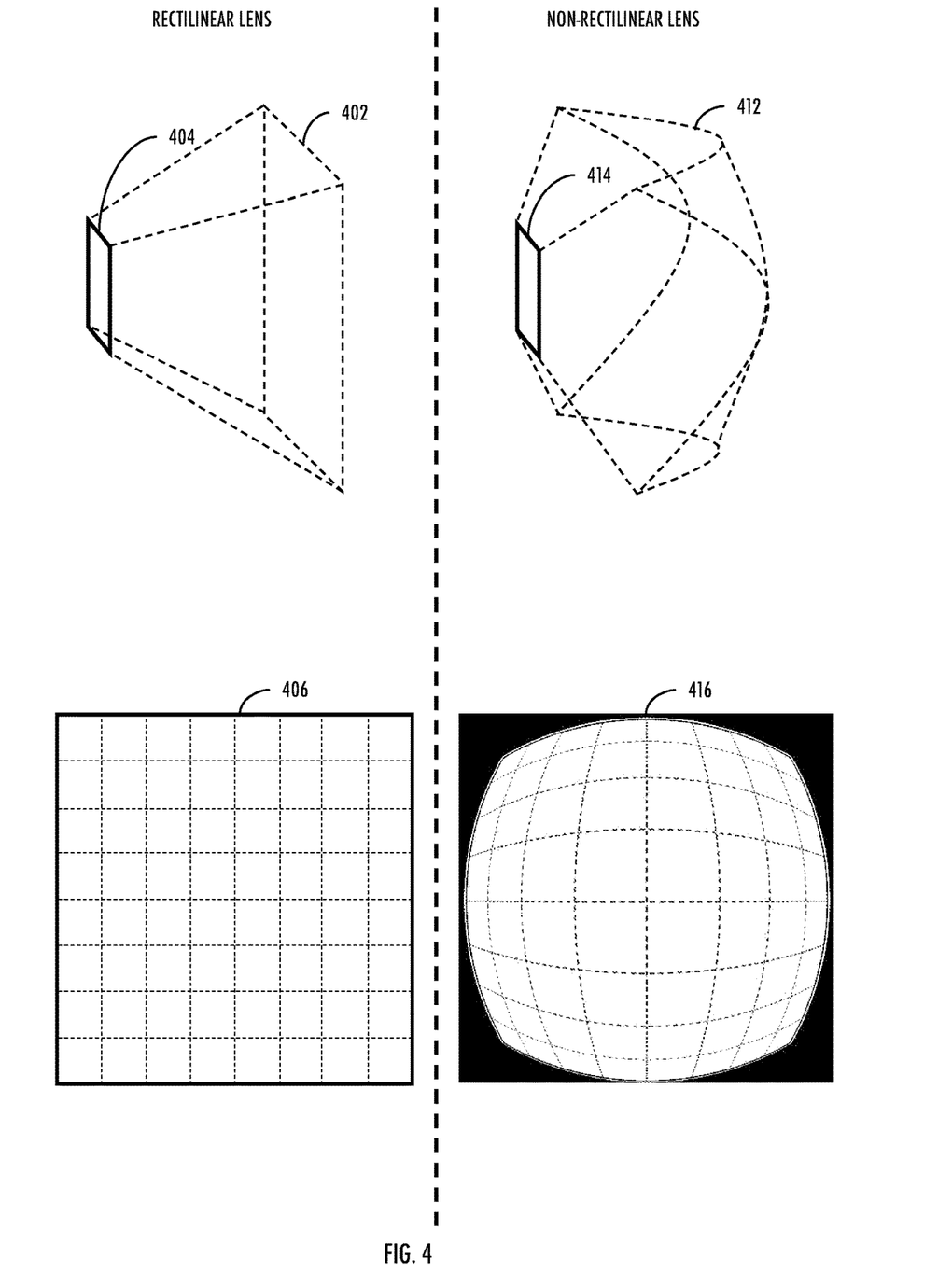
FIG. 4 is a graphical comparison of a rectilinear lens and a non-rectilinear lens, useful to illustrate various aspects of the present disclosure.

FIG. 4 depicts a graphical comparison of a rectilinear lens and a non-rectilinear lens. The rectilinear lens preserves "straightness" when focusing an image 402 onto the camera sensor 404. For instance, a rectilinear image 406 of a straight-lined grid will preserve straight lines. Cinematic cameras generally use rectilinear lenses; however, since rectilinear lenses stretch/enlarge objects at the edge of the field-of-view, these cameras typically only capture a narrow field-of-view (between 30° to 90°). In contrast, non-rectilinear lenses trade off rectilinearity for other desirable properties. For example, some action cameras use panoramic and/or fisheye type lenses to capture a very wide field-of-view (greater than 120°). FIG. 4 also depicts a fisheye lens that focuses an image 412 onto the camera sensor 414. In this case, the straight-lined grid is captured/rendered with curved lines (non-rectilinear image 416).

Notably, a visual comparison of rectilinear and non-rectilinear video feeds may be too imprecise to provide acceptable calibration. A user may subjectively believe that they've attached the two cameras "well-enough" during a shoot, only to realize in post-processing that the footage has undesirable effects at certain angles or during motions. This can be particularly problematic for moving video captures through three-dimensional space (e.g., drone-captured video that "bank" into turns, etc.)

In one aspect of the present disclosure, a pair of piggy-backed cameras can be initially calibrated by performing a rough estimate of the physical offset based on device characteristics (e.g., form factor, lens polynomial, mounting chassis, and/or history of usage). Then, a trained neural network can compare video capture data from both cameras and/or sensor data to fine tune the estimated physical offset. Unlike existing solutions which require the user to modify footage in post-processing (after footage has already been captured), the techniques described hereinafter may be performed in-the-field, prior to capturing footage.

Figure 5:
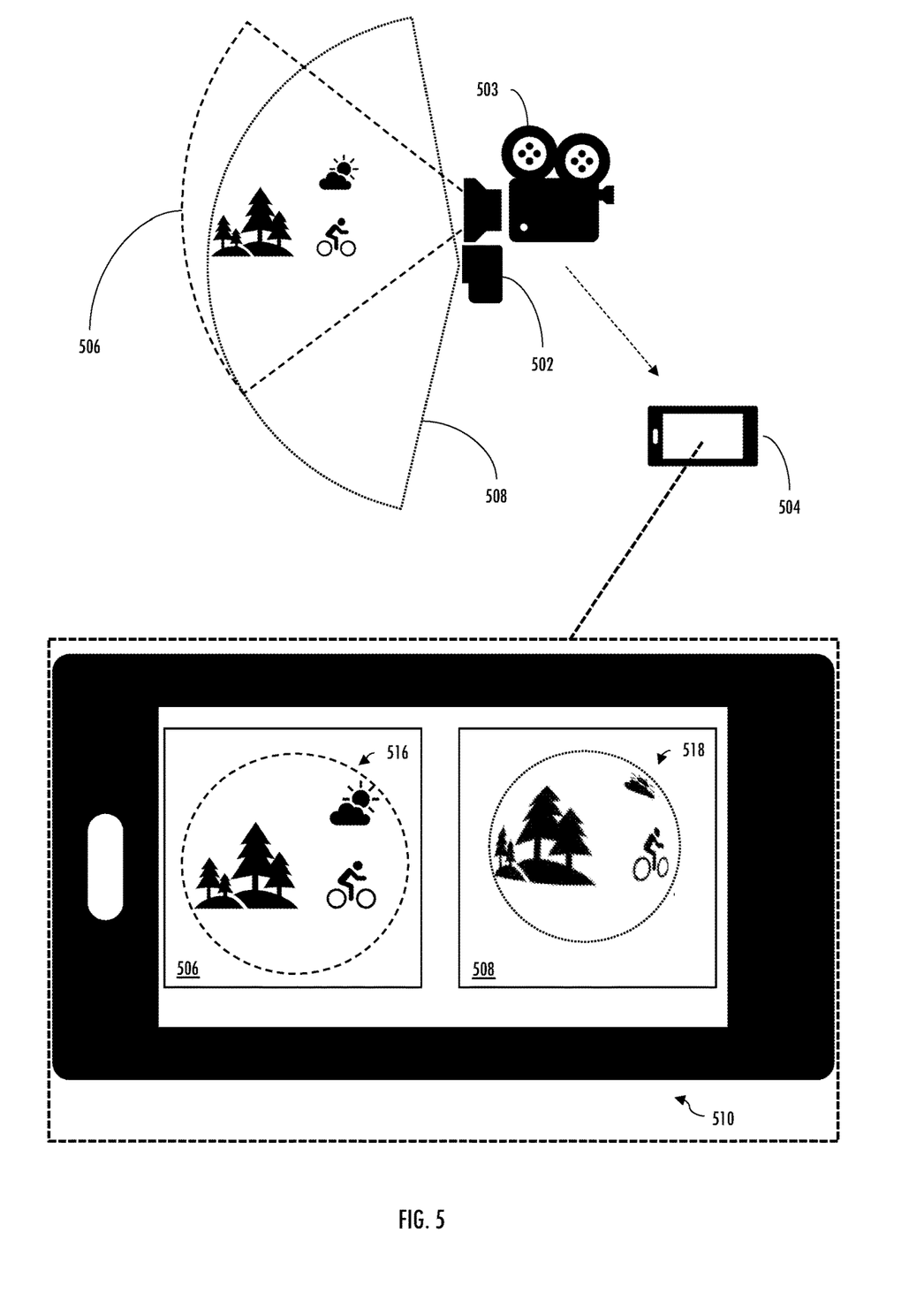
FIG. 5 is one illustrative example of physical offset calibration system, useful to illustrate aspects of the present disclosure.

FIG. 5 provides one illustrative example of physical offset calibration system, useful to illustrate aspects of the present disclosure. As shown, a cinematic camera 503 and action camera 502 in piggybacked configuration capture the same scene. In this case, the cinematic camera 503 captures rectilinear footage 506 that is framed on a subject-of-interest (mountain, bicyclist, sky). The action camera 502 has some physical offset; this results in a non-centered, non-rectilinear footage 508. In the action camera's capture, the subject-of-interest has been non-uniformly distorted e.g., objects closer to the center of the non-rectilinear footage 508 are less distorted than objects at the periphery. The rectilinear footage 506 and non-rectilinear footage 508 are streamed to a mobile device 504. A close-up view of the mobile device's calibration application user interface 510 is shown for reference (and discussed in greater detail below).

A first approximation of the physical offset may be performed using feature detection, edge detection, etc. In one specific implementation, feature detection may compensate for lens differences by weighing certain pixels more than others. For example, the non-rectilinear footage 508 may attempt to match the least distorted pixels at the center of the projection, to pixels from the rectilinear footage 506. In other implementations, the footages may be compared in a common projection. For instance, the non-rectilinear footage 508 may be rectified before comparison to rectilinear footage 506. In either implementation, the physical offset ($P_{offset}$) may be approximated by the pixel shift in the x-y-z axes of the camera ($p_x,p_y,p_z$).

In some variants, the display quality of the rectilinear footage 506 and non-rectilinear footage 508 for the initial calibration process may be reduced to fit within the mobile device 504 display resolution since this footage is unlikely to be used later. The subsequently captured footage may also be stored at its native capture resolution to preserve the image quality for post-processing. While the illustrated example is shown with a mobile device 504 (e.g., a smart phone or laptop), artisans of ordinary skill in the related arts will readily appreciate that other implementations may use the user interfaces (UI) of one (or both) of the cameras, subject to their resolution quality and/or touch screen sensitivity/granularity.

As a brief aside, each camera may independently manage its own clock; however, due to manufacturing tolerances in clock circuitry and differences in environmental noise (e.g., temperature, voltage, etc.), even clocks that have the same nominal clock rate will drift relative to one another. Additionally, differences in overall pipeline length between devices may result in different latencies between the two cameras. In one exemplary embodiment, an initial calibration may be performed during a temporal "calibration window." To time align the cameras, the user may perturb or "jiggle" the 2-camera assembly; the resulting accelerometer and/or gyroscope data spikes captured by the action camera 502 are compared to motion vector spikes in the encoded video of the cinematic camera 503. The sensed spikes and encoded spikes are used to time align the action camera's sensed data to the cinematic camera's video footage. In other words, the time shift that corresponds to the largest cross correlation between sensed spikes and encoded spikes can be used as a reference point for subsequent processing.

Once time aligned, the sensed accelerometer and/or gyroscope data can be used to generate the action camera's camera orientation (CORI) quaternions. Additionally, successive frames of the cinematic camera's footage can be analyzed to infer the visual rotation and/or translation that occurred from the cinematic camera's perspective. This data may be used to estimate offset camera orientation (OCORI) quaternions for the cinematic camera. Motion estimation based on pixel movement is well-understood in the computer vision arts; for example, the average straight-line pixel movement between successive frames can be used as an estimate of lateral movement ("panning") in the horizontal and/or vertical direction. Similarly, the average rotational pixel movement between successive frames may be used to infer rotation about the focal axis. More generally, artisans of ordinary skill in the related arts will readily appreciate that rectilinear projections have characteristic pixel movements for yaw, pitch, roll rotations and vertical, transverse, transaxial translations. The time aligned difference between the cinematic camera's OCORIs and the action camera's CORIs can be used to roughly estimate a quaternion that describes the physical offset according to the equations discussed above. In some cases, the estimated physical offset quaternion may be compared to the first approximation of the physical offset; this may be helpful to assess the quality of the estimated physical offset quaternion. Significant deviations between the first approximation and the estimated physical offset may indicate a "wobble" or other non-rigid coupling, which may be problematic during shooting.

In some variants, the mobile device 504 may also obtain metadata from one (or both) of the cameras that may provide physical form factor information. For example, an action camera may provide a camera model that is associated with specific dimensions and/or form factors. In one such implementation, the metadata track may be structured using a key, length, value (KLV) data format based on SMPTE 336M, Revision 07M, 2007 and entitled "DATA ENCODING PROTOCOL USING KEY-LENGTH-VALUE" incorporated herein by reference in its entirety. Various other data formats (e.g., JSON or XML data) may be substituted with equal success, given the contents of the present disclosure.

While camera model information may be helpful, there are certain applications where such information may be incorrect or otherwise inaccurate. As previously alluded to, certain housing structures and/or mounting mechanisms may significantly change the relative separation distance and/or angular offset of the cameras. For example, some users remove protective housings and/or batteries to reduce the camera weight for aerial drone applications. Other examples include submersible photography; the action camera may be waterproof whereas the cinematic camera may need an external waterproof housing. In some cases, the camera model information may be presented to the user, the user can confirm, adjust, modify, or input camera model information, form factor, and/or housing information accordingly.

In one specific implementation, the estimated physical offset may be visualized as lens overlays on the streaming rectilinear footage 506 and non-rectilinear footage 508 displayed to the user via mobile device 504. In the illustrated example, the rectilinear image captured from the cinematic camera includes a circle lens overlay 516 in the center of the image. A corresponding indicium overlay 518 may be shown in the non-rectilinear image at the estimated physical offset; depending on the estimated position, the indicium overlay 518 may be smaller, larger, shifted vertically/horizontally, and/or asymmetrically stretched/shrunk into oval, ellipse, pear-shaped, or other geometric shape. While the illustrated example uses circular geometries, other implementations may use a "square", "rectangle", "gridlines" or other visualization aid with equal success.

In some variants, the user may fine-tune the estimated physical offset using the mobile device's calibration application user interface 510. Specifically, the user may e.g., drag the visualizations, zoom-in/out, stretch/shrink the circle or indicium in one or more dimensions. Common gesture-based commands may include e.g., single-finger panning, two-finger rotation/zoom, and/or tap-based selection.

While it may be possible to optimize the physical offset based on just a visual inspection during the calibration window, optical analysis of pixel movement from a two-dimensional rectilinear image may not be sufficient to capture a physical offset of the full range of motion in three-dimensional space. For example, objects captured by one camera may be warped differently and/or partially (or wholly) occluded from the other camera. Incipient research in neural network processing techniques for image correction have shown acceptable performance in related problems (e.g., super resolution, noise reduction, etc.); thus, the exemplary embodiment of the present disclosure may additionally use neural network processing to further fine tune the estimated physical offset across a range of motion in three-dimensional space.

Figure 6:
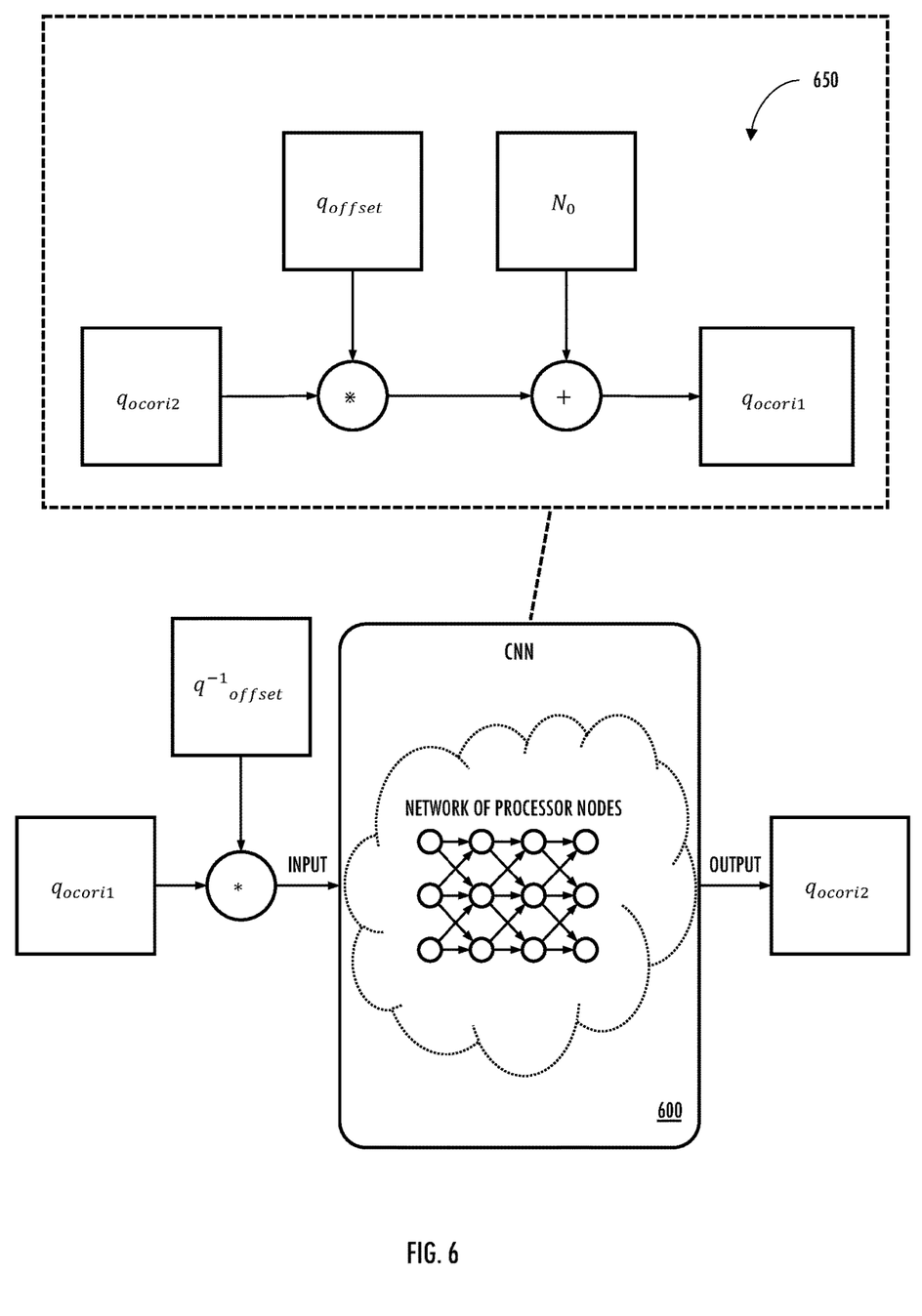
FIG. 6 illustrates one convolutional neural network (CNN) which may be useful in combination with the techniques described herein.

FIG. 6 illustrates one convolutional neural network (CNN) 600 which may be useful in combination with the techniques described herein.

In one exemplary embodiment, the machine learning (ML) algorithm obtains state input, and processes the state input with a neural network of processor nodes. Each processor node calculates a weighted combination of its inputs. The weighting for each processor node may be random initially, but positive/negative reinforcement over multiple iterations is used to train the network to converge on a desired behavior (output). Conceptually, machine learning algorithms learn a task that is not explicitly described with instructions. Since the task is accomplished through dynamic coefficient weighting rather than explicit instructions, machine learning algorithms can change their behavior over time to e.g., improve performance, change tasks, etc.

Since ML training can be based on a large set of data (rather than "best fit" type matching), the neural network output is often qualitatively better for data that is not well characterized or may have very complicated behavior. As but one such example, human visual perception is often non-linear to emphasize certain types of visual information (e.g., sudden movement, edge contrast, etc.) Linear averaging and/or polynomial fitting often does not match subjective human perception. However, neural network techniques may be trained to accentuate image features and/or movement that a human brain is trained to focus on, and attenuate/ignore features that a human brain would ignore. In this case, visual analysis of a physical offset (in three-dimensional space) from 2D images and sensor data may result in a suboptimal fit.

In one exemplary embodiment, the neural network is trained to robustly solve for camera separation distances and angular offsets over a variety of different movements and/or motions, based on a calibration process. As shown, the CNN 600 assumes that the first set of OCORIs (calculated from pixel movement captured by the cinematic camera) are based on the second set of OCORIs (measured by the action camera's sensors) with a physical offset and sensor noise. The simplicity of the foregoing approach enables straightforward neural network training with known input and output data. For example, a library of sensor-based quaternions and pixel-based quaternions may be used to generate training output (training data generation process 650). The library of training pairs may be used to train the CNN. Using known image data also provides quantitative metrics, e.g., a minimum mean squared error (MMSE) can be calculated between the first and second set of OCORIs to evaluate the CNN's performance.

In one embodiment, each processor node of the neural network is a computation unit that may have any number of weighted input connections, and any number of weighted output connections. The inputs are combined according to a transfer function to generate the outputs. In one specific embodiment, each processor node of the neural network combines its inputs with a set of coefficients (weights) that amplify or dampen the constituent components of its input data. The input-weight products are summed and then the sum is passed through a node's activation function, to determine the size and magnitude of the output data. "Activated" neurons (processor nodes) generate output data. The output data may be fed to another neuron (processor node) or result in an action on the environment. Coefficients may be iteratively updated with feedback to amplify inputs that are beneficial, while dampening the inputs that are not.

In one embodiment, the machine learning algorithm 600 emulates each neural network's nodes' processing as an independent thread. A "thread" is the smallest discrete unit of processor utilization that may be scheduled for a core to execute. A thread is characterized by: (i) a set of instructions that is executed by a processor, (ii) a program counter that identifies the current point of execution for the thread, (iii) a stack data structure that temporarily stores thread data, and (iv) registers for storing arguments of opcode execution. Other implementations may use hardware or dedicated logic to implement processor node logic.

As used herein, the term "emulate" and its linguistic derivatives refers to software processes that reproduce the function of an entity based on a processing description. For example, a processor node of a machine learning algorithm may be emulated with "state inputs", and a "transfer function", that generate an "action."

Typically, machine learning algorithms are "trained" until their predicted outputs match the desired output (to within a threshold similarity). Training may occur "offline" with batches of prepared data or "online" with live data using system pre-processing. Many implementations combine offline and online training to e.g., provide accurate initial performance that adjusts to system-specific considerations over time.

More generally, unlike traditional image processing programs that rely on pattern matching between two similar images, the exemplary neural network processing is trained to synthesize an offset camera orientation from two different estimates of the offset camera orientation (OCORI). In other words, the exemplary neural network processing seeks to create the best inference of offset camera orientation based on a sensor-based OCORI and a pixel-based OCORI. In one specific implementation, the CNN makes inferences from patterns in data using e.g., statistical models and/or analysis based on its previously trained data. The inferences may then be used to formulate predicted outputs that can be compared to actual output to generate feedback. Each iteration of inference and feedback is used to improve the underlying statistical models.

While the foregoing discussion is presented in the context of a calibration window, artisans of ordinary skill in the related arts given the contents of the present disclosure will readily appreciate that the techniques may be broadly extended to a "calibration path" as well. In one exemplary embodiment, the piggybacked 2-camera assembly traverses a spatial calibration path. The cinematic camera captures a video of the calibration path and uses optical analysis to generate a first set of OCORIs. A second set of OCORIs are generated based on the action camera's CORIs and the estimated physical offset. The first and second set of OCORIs may be provided to a neural network to perform physical offset optimization.

After traversing the calibration sequence (calibration window and/or calibration path), an accumulated error may be used to evaluate the relative quality of the estimated physical offset. If the accumulated error of the estimated physical offset falls within an acceptance threshold, then the calibration process has succeeded. Subsequent cinematic footage can be quickly stabilized by directly using the action camera's camera orientation (CORI) in combination with the estimated physical offset to generate the offset camera orientation; the offset camera orientation can then be used to counteract camera shake.

Different optimizations may be effectuated by different error functions. As but one such example, an error function that calculates the difference between the sensor based OCORI (based on the action camera's CORIs and the estimated physical offset) relative to the computer vision OCORI (based on optical analysis of the beauty camera's feed) may provide high quality results, at significant computational cost. In another such example, an error function may calculate the difference in the estimated physical offset relative to its previous history—this is much simpler to calculate but may result in worse stabilization results. More generally, different error functions may be selected to achieve a variety of different desirable outcomes.

Notably, the foregoing process can be performed in-the-field before actual capture. This allows the user to check their set-up and fix any issues before capturing the desired footage. More directly, if the accumulated error of the estimated physical offset falls outside the acceptance threshold, then the calibration process has failed. The user can re-adjust their rig and try to re-calibrate. In some variants, the calibration application may identify portions of the calibration window and/or calibration path that failed; this may be particularly useful to troubleshoot the issue. For example, the camera coupling may be loose. In other situations, the coupling between cameras may not be rigid enough to operate at the desired speed/movements.

While the computer vision analysis is presented in the context of a spatial calibration window/path, the techniques could also be used to flag issues in the physical offset estimation during live capture—this may be useful to identify portions of the footage that should be carefully inspected in post-production. Additionally, neural network processing may also be trained to handle raw data of different types; e.g., the neural network could use raw footage and/or sensor data (rather than quaternions) with equal success. For example, the CNN could obtain successive frames of the cinematic camera's footage and the sensed accelerometer and/or gyroscope data.

While the foregoing techniques are described in the context of a convolutional neural network (such as may be found within a mobile device neural network co-processor) for computer vision, artisans of ordinary skill in the related arts will readily appreciate that any neural network that provides iterative first-order optimization (e.g., gradient descent, etc.) may be substituted with equal success. Such implementations may include digital signal processing (DSP), field programmable gate array (FPGA), and/or combinatorial logic-based alternatives.

Exemplary Methods and Apparatus

Figure 7:
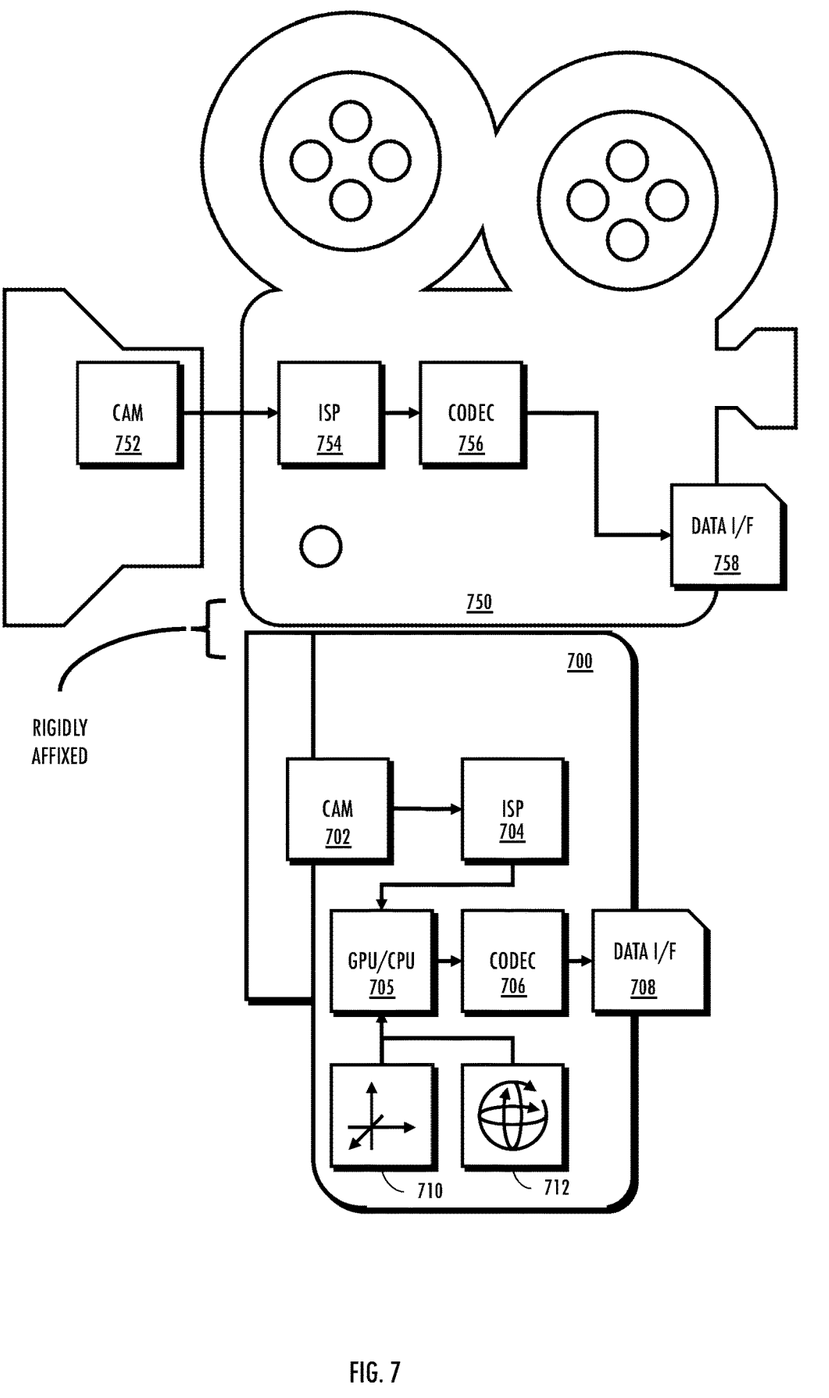
FIG. 7 is a logical block diagram of a first camera that is rigidly affixed to a second camera, in accordance with various aspects of the present disclosure.

FIG. 7 is a logical block diagram of a first camera 700 that is rigidly affixed to a second camera 750, in accordance with various aspects of the present disclosure. As used herein, the terms "rigid", "rigidly affixed", and their derivatives, refer to a physical arrangement of components that does not deform during mechanical stresses (e.g., rotation, translation, etc.) for their intended operation. In other words, the first camera 700 and the second camera 750 are physically coupled such that the rotations, translations, and/or other mechanical perturbations experienced by the first camera 700 are mechanically transferred to the second camera 750 and vice versa. While the foregoing techniques are discussed in the context of a 2-camera assembly, artisans of ordinary skill in the related arts given the contents of the present disclosure will readily appreciate that the techniques may be broadly extended to any number of cameras.

In the illustrated embodiment, the first camera 700 includes: a camera sensor 702, an image signal processor (ISP 704), a processing subsystem 705 (e.g., GPU and/or CPU), a codec 706, a data interface/removable media 708, an accelerometer (ACCL 710), and a gyroscope (GYRO 712). The second camera 750 includes: a camera sensor 752, an image signal processor (ISP 754), a codec 756, and a data interface/removable media 758. While the illustrated example is presented in the context of a cinema-style video camera and an action camera, it is appreciated that the techniques described herein may be practiced by a variety of other apparatus. For example, other implementations may attach a first camera to a video drone, a camera dolly or other camera rig, a smart vehicle, etc. Similarly, while the following discussion is presented in the context of an action camera, it is appreciated that the video and/or audio stream may not be used; in other words, a telemetry-only device could be substituted with equal success.

In the illustrated embodiment, the first camera may be an action camera that can capture video data. Other embodiments of the first camera may include without limitation a cellular/smart phone, a tablet camera, a laptop (with a webcam), an aerial drone, security cameras, self-driving cars, smart appliances and/or industrial automation, and/or any other source of motion data.

In the illustrated embodiment, the second camera is a digital single-lens reflex (DSLR) camera. Other implementations may use a mirrorless camera, a point-and-shoot camera, a digital camcorder, or any other presentation resolution capture device. The second camera may be colloquially referred to as the "beauty camera" and may be used as the basis resolution of the frames of the desired presentation video. Such captures may therefore maximize resolution (e.g., size, number of pixels) and image quality (e.g., pixel depth, color quality, etc.).

In one exemplary embodiment, the first camera 700 may be mounted on the second camera 750 via a standard accessory mounting point (e.g., a "shoe"). For example, one camera (e.g., high-speed camera 700) may be placed in a housing or an accessory attached to a tripod or underside accessory port with an accessory "cold shoe" attachment for connection to another device. In a further embodiment, the attachment may be a "hot shoe" connection and the cameras may be in electronic signal communication for, e.g., ease of video synchronization, camera/exposure settings setup, etc. In rudimentary embodiments, the first camera 700 and the second camera 750 may be held together temporarily by hand or by placing each camera on adjacent tripods. The first camera 700 and the second camera 750 may also be linked via a dual camera tripod mount. Still other linkage mechanisms may include e.g., specially designed rigs, fasteners (e.g., screws, nuts/bolts, nails), dollies, double-sided tape/adhesive, cording/bands, and/or any other physical linkage.

During piggyback camera operation, each camera captures successive captures of image data and encodes the images into frames of video. Specifically, the first camera 700 captures images with its camera sensor 702; performs image signal processing (e.g., de-mosaic, color correction, white balance, etc.) via the image signal processor (ISP 704); obtains sensor data from the telemetry system (ACCL 710 and GYRO 712) and performs in-camera image stabilization via the processing subsystem 705 (e.g., GPU and/or CPU). In comparison, the second camera 750 captures images with its camera sensor 752 and performs image signal processing via the image signal processor (ISP 754). The in-camera stabilized footage and/or quaternions may be encoded into an audio/visual (A/V) data structure by codec 708; similarly, the unstable cinematic footage may be encoded as an A/V data structure by codec 758. The A/V data structures may be stored (written) to removable media 758/708 or transferred off-device via a data/network interface (e.g., Wi-Fi, Ethernet, cellular connectivity, etc.) to a subsequent post-processing apparatus.

As used herein, a "frame" is one of many still images which compose a complete video. In some embodiments, videos may be encoded with multiple frame types. For example, a video may be represented with intra-frames (I-frames), predicted frames (P-frames), and bi-directional frames (B-frames). I-frames are compressed with only intra-frame similarity. Every macroblock in an I-frame only refers to other macroblocks within the same frame. In other words, an I-frame can only use "spatial redundancies" in the frame for compression. Spatial redundancy refers to similarities between the pixels of a single frame. P-frames allows macroblocks to be compressed using temporal prediction in addition to spatial prediction. For motion estimation, P-frames use frames that have been previously encoded. Every macroblock in a P-frame can be temporally predicted, spatially predicted, or "skipped" (i.e., the co-located block has a zero-magnitude motion vector). Images often retain much of their pixel information between different frames, so P-frames are generally much smaller than I-frames but can be reconstructed into a full frame of video. B-frames use temporal similarity for compression—however, B-frames can use backward prediction (a look-backward) to compress similarities for frames that occur in the future, and forward prediction (a look-ahead) to compress similarities from frames that occurred in the past. Notably, while some cameras/encoders may encode certain frames with differences between frames (e.g., P- and B-frames) or even entirely skipped frames, the first camera 700 and the second camera 750 capture each frame at a constant frame rate i.e., a regular (consistent) timing scheme.

In one exemplary embodiment, the first camera's in-camera stabilization uses image orientation (IORI) quaternions to counter rotate camera orientation (CORI) quaternions; the counter-rotated quaternions can be used to crop the first camera's video to give the subjective perception of "smoothness" without completely removing motion. In other words, the IORI should mirror, or otherwise counteract, CORI within a threshold tolerance. Significant deviations in IORI, relative to CORI, may indicate problematic frames; similarly small alignment deviations may indicate good frames. For a 2880×2880 capture/1920×1080 display ratio, the CORI and IORI have nearly a 20% threshold tolerance. Artisans of ordinary skill in the related arts will readily appreciate that other implementations will provide a greater (or lesser) degree of tolerance.

Table 1 provides an illustrative set of metadata, useful in conjunction with the various embodiments described herein:

TABLE 1

| FourCC | Property | Approximate Frequency | Units | Comment |
|---|---|---|---|---|
| ACCL | 3-axis accelerometer | 200 | m/s$^2$ | Data order (by axis) Z, X, Y |
| GYRO | 3-axis gyroscope | 400 | rad/s | Data order (by axis) Z, X, Y |
| MAGN | magnetometer | 24 | µT | Camera pointing direction |
| CORI | Camera ORIentation | frame rate | n/a | Quaternions for the camera orientation since capture start |
| IORI | Image ORIentation | frame rate | n/a | Quaternions for the image orientation relative to the camera body |
| GRAV | GRAvity Vector | frame rate | n/a | Vector for the direction for gravity |

Techniques for structured metadata representation may be used consistent with the present disclosure, the foregoing being purely illustrative. For example, other techniques are described in U.S. Pat. No. 10,431,258 entitled "APPARATUS AND METHODS FOR EMBEDDING METADATA INTO VIDEO STREAM" issued Oct. 1, 2019, and Newman, D., "GPMF Introduction" for the GPMF Parser, retrieved Jul. 7, 2021 from https://github.com/gopro/gpmf-parser/blob/master/docs/README.md, each of which is incorporated herein by reference in its entirety. As described therein, additional sensor types and a hierarchical metadata storage approach may be used and/or extended consistent with the principles described herein.

As previously noted, the first camera's motion may not directly correspond to the second camera's motion because of their physical offset; however, the first camera's IORIs could be modified with physical offset information and/or neural network processing to achieve stabilization with the aforementioned quaternion conjugation described above.

Figure 8:
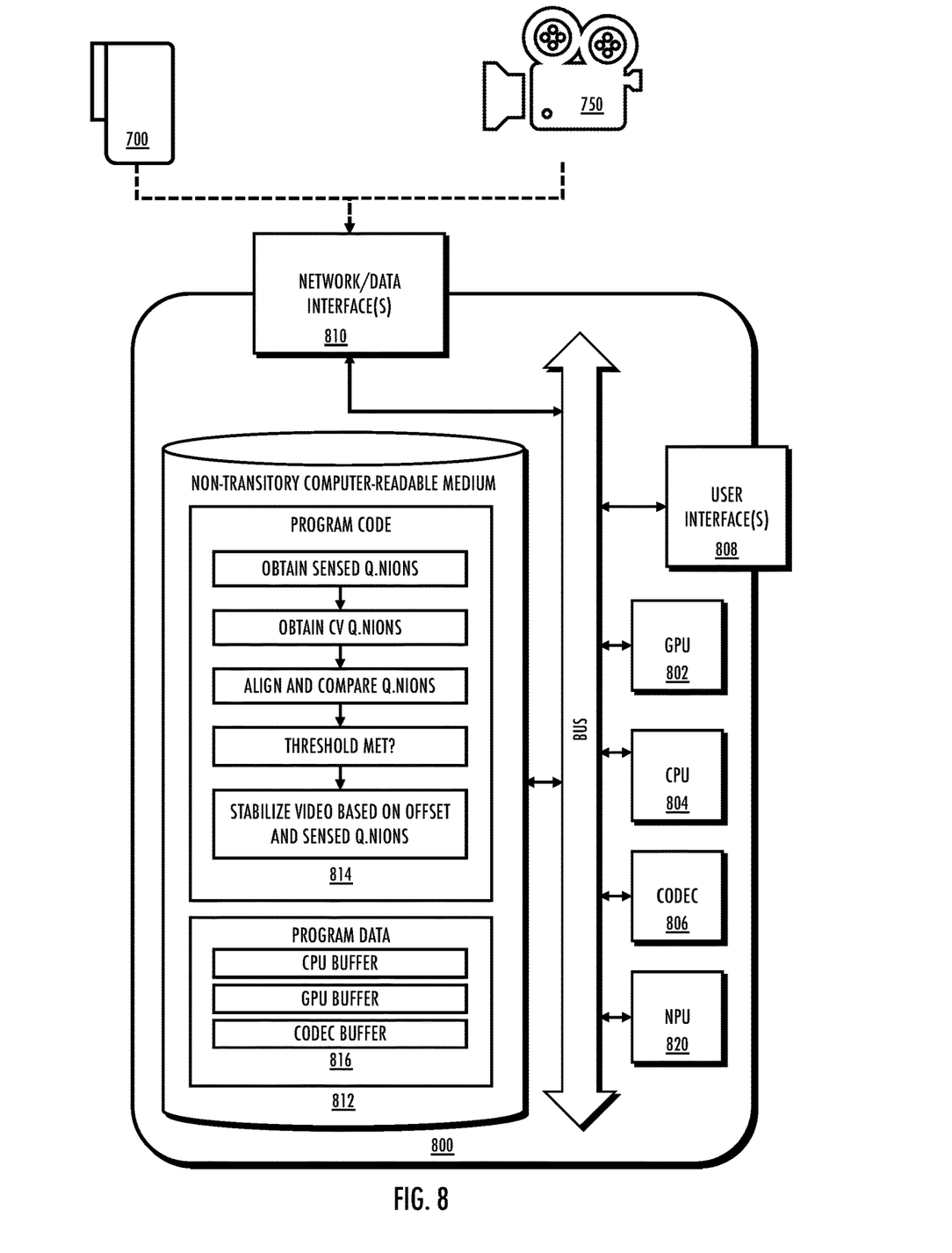
FIG. 8 is a logical block diagram of a calibration device, useful to illustrate various aspects of the present disclosure.

FIG. 8 depicts a logical block diagram of a calibration device 800, useful to illustrate various aspects of the present disclosure. The calibration device 800 includes a processor subsystem, a memory subsystem, a user interface subsystem, a network/data interface subsystem, and a bus to connect them. In one exemplary embodiment, the calibration device 800 may be a mobile device that can perform calibration of video footages in-the-field. Other embodiments of calibration device 800 may include without limitation: an action camera, a tablet, a laptop, a television, a workstation, and/or any other device that can perform rudimentary image processing.

In one embodiment, the processor subsystem may read instructions from the memory subsystem and execute them within one or more processors. The illustrated processor subsystem includes: a graphics processing unit (GPU 802), a central processing unit (CPU 804), a codec 806, and neural networking logic. Other processor subsystem implementations may multiply, combine, further subdivide, augment, and/or subsume the foregoing functionalities within these or other processing elements. For example, multiple GPUs may be used to perform high complexity image operations in parallel and/or neural network processing. Similarly, codec functionality may be subsumed with either GPU or CPU operation via software emulation.

In one exemplary embodiment, the neural networking logic comprises a neural processing unit (NPU 820). Other examples of neural networking logic may include tensor processing unit (TPU), neural network processor (NNP), and/or intelligence processing unit (IPU). Certain neural network logic implementations may be pre-trained for spe cific tasks; examples of such logic include without limitation: vision processing unit (VPU) and/or graph processing unit (GPU).

Neural network co-processors implement all the necessary control and arithmetic logic necessary to execute machine-learning algorithms. As a practical matter, neural network processing is characterized by a disproportionately large numbers of multiply-accumulate (MAC) operations; e.g., for each input data, the neural network must update every processing node state. Unlike traditional computing logic (e.g., CPUs), neural network co-processors often use multiple processing cores operating in parallel; each processing core may use a small instruction set optimized for MAC computations. Each core may also include its own memory to minimize memory bottlenecking.

In one embodiment, the user interface subsystem may be used to present media to, and/or receive input from, a human user. The user interface subsystem may include physical components (e.g., buttons, keyboards, switches, scroll wheels, etc.) or virtualized components (via a touchscreen). In one exemplary embodiment, the user interface subsystem 808 may include an assortment of a display, touchscreen, physical buttons, speaker(s), and a microphone.

In one embodiment, the network/data interface subsystem may be used to receive data from, and/or transmit data to, other devices. The network/data interface subsystem may include: wired interfaces, wireless interfaces, and/or removable memory media. In one exemplary embodiment, the network/data interface subsystem 810 may include network interfaces including, but not limited to: Wi-Fi, Bluetooth, Global Positioning System (GPS), USB, and/or Ethernet network interfaces. Additionally, the network/data interface subsystem 810 may include removable media interfaces such as: non-volatile memory cards (such as MMC, SD, mini-SD, and micro-SD cards), Flash drives, hard drives, and/or any other optical/electrical/magnetic media (e.g., MMC cards, CDs, DVDs, tape, etc.)

In one embodiment, the network/data interface subsystem 810 may receive videos from multiple cameras. For example, in one specific scenario, the calibration device 800 may use motion data from the first camera 700 to stabilize the unstable cinematic footage of the second camera 750. For example, the calibration device may be a smartphone that obtains live streaming feeds from the cameras over a wireless ad hoc network. In other examples, the calibration device may be a laptop or high-end workstation that obtains post-capture data via removable media and/or wired internet. In some embodiments, the post-capture data may be stored in the same video file (e.g., as separate tracks) whereas in other embodiments, the videos may be stored in separate data structures (e.g., accessible on different storage devices). Still other systems may be substituted with equal success, given the contents of the present disclosure.

In one embodiment, the memory subsystem may be used to store (write) data locally at the calibration device 800. In one exemplary embodiment, data may be stored as non-transitory symbols (e.g., bits read from non-transitory computer-readable mediums.) In one specific implementation, the memory subsystem 812 is physically realized as one or more physical memory chips (e.g., NAND/NOR flash) that are logically separated into memory data structures. The memory subsystem may be bifurcated into program code 814 and/or program data 816. In some variants, program code and/or program data may be further organized for dedicated and/or collaborative use. For example, a multicore GPU and/or CPU system may allocate dedicated memory buffers to facilitate parallelized operation. Similarly, the codec 806 may have a dedicated memory buffer to avoid resource contention.

In one embodiment, the program code includes non-transitory instructions that when executed by the processor subsystem cause the processor subsystem to perform tasks which may include: calculations, and/or actuation of the user interface subsystem and/or network/data interface subsystem. In some embodiments, the program code may be statically stored within the calibration device 800 as firmware. In other embodiments, the program code may be dynamically stored (and changeable) via software updates. In some such variants, software may be subsequently updated by external parties and/or the user, based on various access permissions and procedures.

In one embodiment, the tasks include obtaining sensed quaternions from the first camera (e.g., an "action" camera). In some implementations, the sensed quaternions are obtained from a motion information metadata track within an A/V data structure. For example, the sensed quaternions may be calculated from raw accelerometer and/or gyroscope readings. In other examples, the metadata track may include pre-processed camera and/or image orientation data (CORI/IORI). While the present disclosure is presented in the context of quaternion data structures, any data structure suitable for representing device motion, rotational and/or linear displacement, velocity and/or acceleration, may be substituted with equal success.

In one embodiment, the tasks include obtaining computer vision quaternions from the second camera (e.g., the "beauty" camera). In some implementations, the processor subsystem may attempt to estimate the second camera's motion based on pixel information. Due to the relatively high computational complexity of optical motion estimation, the computer vision quaternions may be estimated from a "calibration window" of time and/or over a "calibration path" of space.

As a brief aside, motion vectors may represent motion (or displacement) of one or more pixel data captured within individual video frames. Typically, motion vectors define motion as distances in 2 dimensions (e.g., an x component and y component of motion). Motion vectors may also be characterized by direction(s) of motion (linear and/or angular) and magnitude(s) of motion. More complex representations of motion may also be substituted with equal success (e.g., light fields in three dimensions, quaternions in four dimensions, etc.)

There are two sources of pixel motion over time: subject motion and apparent motion (induced by device motion relative to the subject). The calibration device 800 may assess motion within an entire video frame (e.g., combination of motion vectors associated with portions of the video frame) or motion within particular portion(s) of the video frame. For example, video frames of video content may be divided into multiple portions (e.g., macro blocks) and motion vectors of individual portions may be determined. Motion vectors of the individual portions may be combined (e.g., summed, square summed, averaged) to determine the motion for the entire video frame. Individual video frames of the video content may be associated with global motion (e.g., motion of the frame as a whole) and/or local motion (motion of a portion of the frame).

In some embodiments, the calibration device 800 may assess motion within video content based on video compression and/or other information. In one such implementation, video compression represents video as intra-frames (I-frames), predicted frames (P-frames), and bi-directional frames (B-frames). P- and B-frames may include information regarding changes in the video frames from prior frames, subsequent frames, or both. This compression information may be used to characterize/define the motion of the video content. The calibration device 800 may use such information to assess the motion of the video content captured during the calibration window and/or calibration path.

In one embodiment, the tasks are configured to align and compare the sensed quaternions and the computer vision quaternions for the calibration window and/or the calibration path. In one specific implementation, the sensed quaternions and the computer vision quaternions are cross correlated to determine the alignment that results in the highest correlation value. While the foregoing discussion is presented in the context of a cross correlation, other schemes for peak detection may be substituted with equal success, given the contents of the present disclosure. Peak detection may incorporate smoothing, filtering, baseline detection, and/or absolute magnitude calculations.

Once the sensed quaternions and the computer vision quaternions are aligned, the quaternions can be compared to determine their relative offset from one another. Notably, the mathematical difference in quaternions corresponds to a physical offset. As a practical matter, sensor measurements and/or optical analysis may both have some margin of error, thus the estimated physical offset may vary over time. Some amount of variation may be corrected with user adjustment and/or iterative fine tuning. However, large variations over the calibration window/path may indicate that the cameras are not sufficiently stabilized relative to one another.

In one aspect of the present disclosure, additional processing may be used to further improve the estimated physical offset. In one specific implementation, neural network processing may be used to adjust the estimated offset based on the sensed quaternions and the computer vision quaternions. In particular, the initially estimated physical offset is used as a first "guess". Then during the calibration window and/or calibration path, the neural network logic may additionally refine the estimated physical offset according to an error function.

Error functions provide the neural network logic with a relative measure of distance from steady state behavior. Different error functions change the convergence behavior of the neural network logic. As but one such example, the user may desire the beauty footage to be stabilized according to the action footage. In such cases, the error function may calculate the difference between the corrected beauty camera footage (with some offset) and the in-camera stabilized action camera footage—the measure of difference between these two footages may be used to assess the quality of the offset stabilization. Notably, neural network footage that is trained based on this error function may result in beauty footage that looks like it was taken by an action camera e.g., the image orientation may closely counteract the sensed motion experienced by the action camera. Since the action camera has a smaller physical mass, the stabilization may appear "faster" or "lighter" that would be expected. In another such example, the user may desire the beauty footage to be stabilized according to its own frame of reference to give the perception of a more massive camera; in such cases, the error function may calculate the amount of image motion for the corrected beauty camera footage (with some offset) in isolation. Still other examples may try to optimize for the physical offset estimation variance; this simpler calculation is easier to perform and may be suitable for platforms with limited compute resources e.g., mobile devices.

While the foregoing discussion is presented in the context of an initial calibration window and/or calibration path, the techniques could be broadly extended to live capture. For example, an alignment and rough estimate of physical offset may be performed during an initial calibration, then the estimated physical offset may be further refined during subsequently captured footage. In some variants, the subsequently captured footage may be streamed from the capture devices to a calibration device. For example, a beauty camera and an action camera may live stream their captured footage to a smart phone. The smart phone may use its on-board neural networking logic to stabilize the unstable beauty footage stream (and improve its estimated physical offset).

Technological Improvements and Other Considerations

The above-described system and method solves a technological problem in industry practice related to the calibration of telemetry data for piggybacked video capture. The various solutions described herein directly address a problem that is created by limitations of the capture mechanisms of cameras. Specifically, the telemetry data that is used to stabilize an action camera is measured at some physical offset from the beauty camera. Various aspects of the present disclosure resolve this by using an initial calibration sequence to roughly estimate the physical offset. The estimated physical offset may be further refined using neural network processing that is trained to match human perception. The resulting unstable beauty footage may then be stabilized based on the physical offset.

As a related consideration, existing techniques for stabilizing unstable footage in post-processing is computationally complex. For example, previous solutions rely on optical analysis of image data to determine camera motion (and corresponding counter rotations). In many cases, these calculations are unsuitable for operation during capture and/or within the mobile device environment. The various solutions described herein calculate a quaternion offset to sensor-based quaternions. Sensor-based quaternions are sensed (not computed) and quaternion manipulations can be performed within embedded systems. Additionally, ongoing adjustments to estimated physical offsets may be calculated using neural network logic that is already widely available in embedded devices. In other words, the techniques described herein represent an improvement to the field of embedded computing environments.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for calibrating a camera system, comprising:
   obtaining sensed quaternions from a first camera of the camera system;
   obtaining computer vision quaternions from calibration footage shot by a second camera of the camera system;
   aligning the sensed quaternions and the computer vision quaternions for a calibration sequence;
   comparing the sensed quaternions and the computer vision quaternions to obtain an estimated physical offset quaternion; and
   stabilizing unstable footage from the second camera based on a corresponding set of sensed quaternions from the first camera and the estimated physical offset quaternion.

2. The method of claim 1, further comprising streaming the calibration footage from the second camera during the calibration sequence;
   streaming a second calibration footage from the first camera during the calibration sequence; and
   displaying the calibration footage and the second calibration footage via a graphical user interface.

3. The method of claim 2, further comprising reducing at least one resolution of the calibration footage and the second calibration footage for display via the graphical user interface.

4. The method of claim 3, further comprising obtaining user input via the graphical user interface to adjust the estimated physical offset quaternion.

5. The method of claim 1, further comprising providing the sensed quaternions and the computer vision quaternions to a neural network logic; and
   adjusting the estimated physical offset quaternion based on an output of the neural network logic.

6. The method of claim 1, where the calibration sequence comprises a calibration window and where the sensed quaternions and the computer vision quaternions are aligned based on peak detection during the calibration window.

7. The method of claim 6, where the unstable footage from the second camera and the corresponding set of sensed quaternions from the first camera are captured outside the calibration window.

8. An apparatus configured to calibrate a camera system, comprising:
   a network interface configured to communicate with a first camera and a second camera of the camera system;
   a graphical user interface;
   a processor; and
   a non-transitory computer-readable medium comprising one or more instructions which, when executed by the processor, causes the apparatus to:
      obtain sensed quaternions from the first camera;
      calculate computer vision quaternions from calibration footage shot by the second camera;
      aligning the sensed quaternions and the computer vision quaternions for a calibration sequence;
      comparing the sensed quaternions and the computer vision quaternions to obtain an estimated physical offset quaternion; and
      stabilizing unstable footage from the second camera based on a corresponding set of sensed quaternions from the first camera and the estimated physical offset quaternion.

9. The apparatus of claim 8, further comprising a neural processing unit; and
   where the non-transitory computer-readable medium further includes one or more instructions which, when executed by the neural processing unit, causes the neural processing unit to:
      obtain the sensed quaternions and the computer vision quaternions;
      emulate a neural network of processor nodes; and
      adjust the estimated physical offset quaternion.

10. The apparatus of claim 8, further comprising a codec; and
    where the non-transitory computer-readable medium further includes one or more instructions which, when executed by the codec, causes the codec to:
       decode a first footage from the first camera;
       decode a second footage from the second camera; and
       provide the first footage and the second footage for display via the graphical user interface.

11. The apparatus of claim 8, further comprising a graphical processing unit; and
where the non-transitory computer-readable medium further includes one or more instructions which, when executed by the graphical processing unit, causes the graphical processing unit to calculate motion vectors from the calibration footage shot by the second camera, where the computer vision quaternions are based on the motion vectors.

12. The apparatus of claim 8, where the network interface is configured to stream the unstable footage from the second camera; and
where the non-transitory computer-readable medium further includes one or more instructions which, when executed by the processor, causes the processor to:
counter rotate the unstable footage based on the corresponding set of sensed quaternions from the first camera and the estimated physical offset quaternion to generate streaming stable footage; and
display the streaming stable footage via the graphical user interface.

13. The apparatus of claim 8, where the non-transitory computer-readable medium further includes one or more instructions which, when executed by the processor, causes the processor to:
obtain a first audio/visual data structure from the first camera comprising an in-camera stabilized footage and the sensed quaternions; and
obtain a second audio/visual data structure from the second camera comprising the calibration footage.

14. The apparatus of claim 8, where the non-transitory computer-readable medium further includes one or more instructions which, when executed by the processor, causes the processor to obtain a metadata file identifying a form factor of the first camera or the second camera.

15. A non-transitory computer-readable medium comprising one or more instructions which, when executed by a processor, causes a device to:
calculate a first set of quaternions corresponding to a first camera;
calculate a second set of quaternions corresponding to a second camera;
align the first set of quaternions and the second set of quaternions;
compare the first set of quaternions and the second set of quaternions to obtain an estimated offset quaternion;
determine whether the estimated offset quaternion satisfies an acceptance threshold; and
stabilize unstable footage into stabilized footage based on the estimated offset quaternion.

16. The non-transitory computer-readable medium of claim 15, further comprising instructions which, when executed by the processor, causes the device to adjust the estimated offset quaternion based on user input.

17. The non-transitory computer-readable medium of claim 15, further comprising instructions which, when executed by the processor, causes the device to adjust the estimated offset quaternion based on output from a neural processing unit.

18. The non-transitory computer-readable medium of claim 15, further comprising instructions which, when executed by the processor, causes the device to display the stabilized footage.

19. The non-transitory computer-readable medium of claim 15, further comprising instructions which, when executed by the processor, causes the device to encode the stabilized footage.

* * * * *